Patented Apr. 8, 1930

1,754,170

UNITED STATES PATENT OFFICE

FRIEDRICH JOHANNSEN, OF MAGDEBURG, GERMANY, ASSIGNOR TO THE FIRM FRIED. KRUPP GRUSONWERK AKTIENGESELLSCHAFT, OF MAGDEBURG-BUCKAU, GERMANY

PROCESS FOR TREATING ORES AND METALLURGICAL PRODUCTS, SLAGS, AND THE LIKE

No Drawing. Application filed October 14, 1926, Serial No. 141,675, and in Germany November 5, 1925.

This invention relates to a process for treating ores and metallurgical products, slags and the like, which contain volatilizable metals such as zinc, tin, lead, antimony, arsenic, quick-silver and bismuth, which can be recovered in the form of metal fumes. By the known processes in this art, the ore and the like, together with reduction material or other materials serving for volatilization of the metals are fed into a metallurgical furnace, for example a rotary kiln, continuously or intermittently, and heated while the material goes through the furnace. The metals liberated by the effect of the heat and reduction materials are volatilized and oxidized with the formation of oxides or other compounds which are carried out with the furnace gases and recovered in a collecting device in dust form.

An essential condition for a satisfactory recovery from the given material is that the charge shall not be melted or slagged in the reduction or volatilization zone. Nevertheless, there must be maintained in the reduction or volatilization zone a sufficiently high temperature, for example, for zinc-containing materials 1000° to 1300° C., in order that the chemical separation of the volatile metals out of the charging material by means of the reducing agents and the like may take place with sufficient rapidity and completeness. There are, however, ores and other materials which because of their composition and chemical properties melt easily. If one charges an easily fusible material in the usual way together with reduction or fuel material in the preliminary zone, that is, between the entrance end and the reduction zone of the furnace, there is produced because of the combustion of the fuel in the oxidizing atmosphere so high a temperature that the charge according to its chemical properties either becomes fluid, or at least at the entry into the hot reduction zone goes over into the fluid condition. This has the disadvantage that the reduction and volatilization proceed incompletely and besides, the specifically lighter combustion material rises to the surface of the fluid charge and is for the most part uselessly burned. This can occur, as above pointed out, with certain especially easily meltable ores or other materials, even in the preliminary zone.

The essential of this invention consists therein that by special means which are further described below, the melting is prevented, or in case a melting has already occurred before the reduction zone, this melting is obviated at the entrance of the charge into the reaction zone. In order to obtain this result the reducing materials, in whole or in part, and other additions needed in carrying out the process are added after or during the entrance of the charge into the reduction and vaporization zone and thereby mixed with the charge. By the addition of reducing or combustion material in the reaction zone, the melting is prevented or lessened for a variety of reasons. If one uses non-volatile combustion material (e. g. coke or anthracite), the infusible carbon acts as a stiffening material. Still more effective is the use of raw combustible material containing gases. This is immediately decomposed, and releases distillation gases. This procedure requires heat which is drawn out of the charge. The resulting gases have also time to burn in the furnace chamber between the reaction zone and the exit opening, so that a contamination of the metallic oxid as recovered by tar vapors and the like is avoided. The cooling effect of the combustion material can be still further increased if it is introduced into the chamber in a moist condition. By the vaporization of water, still further heat is absorbed and thereby the desired prevention of melting of the charge is increased.

This effect can also be further secured in that there are introduced into the charge simultaneously with the combustion material, other materials which by their quicker effect on the charge produce combinations of higher melting point. Lime or limestone is such a material. Depending upon the composition of the charge, there can also be used other materials such as clay or other silicates, silica, etc.

In some cases is it desirable to introduce into the reaction zone ore which when of suitable composition can, just as in the case of lime, make an easily fusible charge more difficultly fusible. The ore introduced into the easily fusible charge in the reaction zone envelops the charge and also serves to produce a cooling effect, since there occurs a vigorous reducing action on the mineral or metal substances in the ore. This reaction is endothermic in character and heat is absorbed which otherwise would be active in melting the charge. If the ore introduced into the reaction zone is entirely or in part finely granular, the further advantage is obtained that a contamination of the oxide to be recovered by any fine ore dust carried therewith is largely avoided.

Further, the manner of introduction of the fuel and other materials, and the manner and rapidity of the mixing in the charge can prevent or reduce the melting of the charge. The fuel can be introduced from the back or the front end of the furnace, according to the methods used in powdered dust firing.

The fuel, etc., can also be introduced through the walls of the furnace by any suitable arrangements of the well known art of charging, and at any desired place. Any one or more of these methods can be simultaneously used.

By regulation of the pressure of the carrying gases (air, steam, etc.) and by varying the shape of the tuyère nozzle to produce more or less spreading of the material introduced, wide variations in the regulation of the introduced materials can be effected.

It will be understood that in a furnace, such as a rotary kiln, the charge as it progresses through the kiln is graually heated up to the high temperature necessary for reduction and volatilization. This portion of the furnace has been called the preliminary zone.

When the charge of ore and reducing material reaches the reducing or reaction zone it is subjected to such high temperatures that it may be actually fused, which is undesirable, because there is less ready and complete liberation of the vaporized metals from a fused mass than from an unfused mass of continuously agitated ore and reduction material, and by preventing such fusion or obviating its effect, the formation of stable chemical compounds from which the metal is volatilized only with difficulty, is prevented. The fusion of the charge in the reaction zone is prevented or corrected by the various methods above described.

This application is a continuation in part of my application Serial No. 79,246, filed January 4, 1926.

I claim:

1. The process for treating easily fusible ores and metallurgical products which contain volatilizable metals which consists in feeding the charge into a rotary furnace through which it progresses and in which it is continuously agitated, progressively heating the charge in an oxidizing atmosphere to a temperature at which the volatilizable metals will be reduced and vaporized, delivering the materials requisite for the completion of the reduction and vaporization of the metals wholly or in part into this highly heated portion of the furnace where the zone of reaction begins where they are continuously mixed with the charge thereby reducing and volatilizing the volatilizable metals, and immediately oxidizing the metallic vapors so produced, the conditions being so controlled that fusion of the charge in the reduction zone is prevented.

2. Process according to claim 1, characterized thereby that the materials required for the volatilization are added wholly or in part in the form of raw fuel such as stone coal, ground coal, whereby the gaseous products formed therefrom separate on their entrance into the hot zone and are burned within the furnace, while the entirely or only partially degasified fuel is mixed with the charge as a reduction agent.

3. Process according to claim 1, characterized thereby that ore is introduced directly into the reaction zone of the process.

In testimony whereof the foregoing specification is signed.

Dr. Ing. FRIEDRICH JOHANNSEN.